(No Model.)
H. LOWE.
CIRCLE SWITCH FOR GALVANIC BATTERIES.
No. 274,452. Patented Mar. 20, 1883.
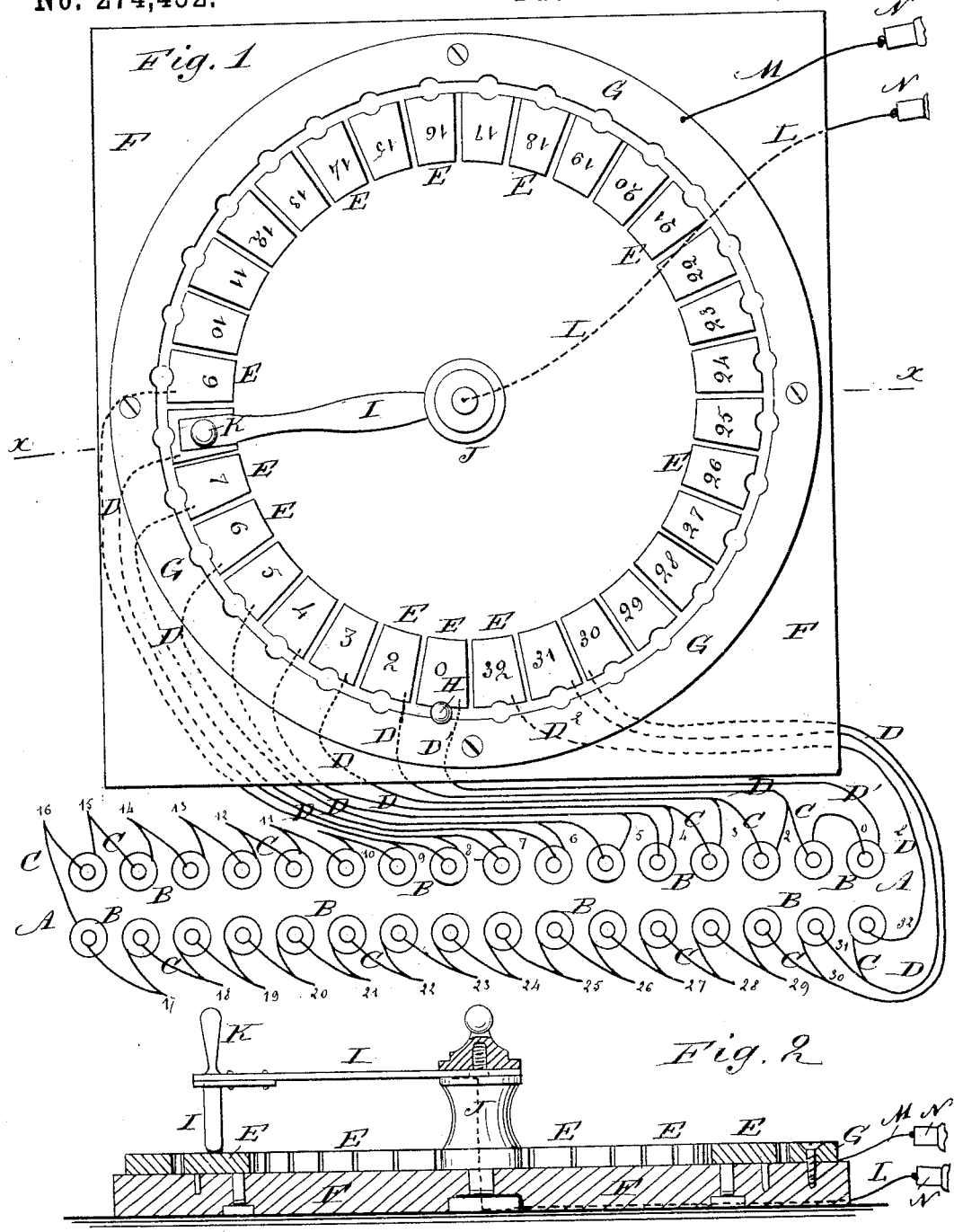
WITNESSES:
C. Neveux
C. Sedgwick
INVENTOR:
H. Lowe
BY Munn & Co
ATTORNEYS.

UNITED STATES PATENT OFFICE.

HENRY LOWE, OF BROOKLYN, NEW YORK.

CIRCLE-SWITCH FOR GALVANIC BATTERIES.

SPECIFICATION forming part of Letters Patent No. 274,452, dated March 20, 1883.

Application filed August 14, 1882. (No model.)

*To all whom it may concern:*

Be it known that I, HENRY LOWE, of Brooklyn, in the county of Kings and State of New York, have invented a new and useful Improvement in Circle-Switches for Galvanic Batteries, of which the following is a full, clear, and exact description.

Reference is to be had to the accompanying drawings, forming a part of this specification, in which similar letters of reference indicate corresponding parts in both the figures.

Figure 1 is a plan view of my improvement, part of the connecting-wires being removed. Fig. 2 is a sectional elevation of the same, taken through the line $x\ x$, Fig. 1.

The object of this invention is to promote convenience in controlling the power of galvanic batteries, when used for remedial purposes, in such a manner that a stronger or weaker current can be used, as may be required.

The invention consists in a circle-switch for galvanic batteries, constructed with an insulated annular conducting-plate surrounding a circle of insulated plates and connected with one of said plates by an adjustable plug, and with another of said plates by conducting-wires and a switch-arm, the said plates being connected with the cells of a battery by conducting-wires, whereby any desired number of battery-cells, and from any desired part of the battery can be included in the circuit, as will be hereinafter fully described.

A represents a galvanic battery, which may be formed of any desired number of cells, B. In the drawings the battery is represented as being formed of thirty-two cells, the negative pole of each cell, except the first and last, being connected with the positive pole of the adjacent cell by a conducting-wire, C. Each of the wires C, except the one connecting the first and second cells, is connected by a conducting-wire, D, with one of a series of conducting-plates, E, the first and last plates of the series being excepted. The first plate of the series is connected with the positive pole of the first cell B by a conducting-wire, D', and the last plate of the series is connected with the negative pole of the last cell B by a conducting-wire, D². The plates E are arranged in a circle, as shown in Fig. 1, and are insulated from each other and from the stand F, to which they are attached. The circle of insulated plates E is surrounded by a ring conducting-plate, G, which is insulated from the plates E and from the stand F, to which it is attached. The plate G is placed at such a distance from the plates E that a connection can be formed between it and either of the said plates E by a plug, H, introduced between the adjacent edges of the said plates G E.

I is the switch-arm, which is pivoted to a conducting-support, J, attached to the stand F at the center of the circle of plates, E, the said switch-arm being made of such a length as to reach to the said plates E, so that it can be brought into contact with either of the said plates E when desired. The switch-arm I is provided with a non conducting handle, K, for convenience in moving it.

With the conducting-support J is connected the end of a conducting-wire, L, and with the ring-plate G is connected the end of another conducting-wire M, so that the electric circuit can be closed by bringing the said wires L M into connection. The wires L M are designed to be provided with handles N, to be grasped by the patient, or with other electrodes, to be applied to any part of the patient's body through which it may be desirable to send an electric current. With this construction, by adjusting the plug H or the switch I any desired number of cells B can be included in the circuit, and an electric current of any desired power can be obtained.

In the arrangement shown in Fig. 1 the plug H is placed between the first plate E of the series and the ring-plate G, and the switch-arm I is placed upon the eighth plate E, so that the current of electricity will pass through eight cells B, along the eighth wire D to the eighth plate E, along the switch-arm I, conducting-support J, and wire L to the patient, back through the wire M, annular plate G, the plug H, the first plate E, and the first wire D' to the first cell B, completing the circuit.

By adjusting the plug H and the switch-arm I any desired number of cells B can be used, and the said cells can be taken in any desired part of the battery, so that if any cell B or connecting-wire D should get out of order, the cells upon either side of the said cell or wire can be used.

I am aware that a battery for therapeutic purposes, consisting of two switches, insulated the one from the other, and adapted to rotate around a common center, and independently connected with the wires or opposite ends of the wire by which the circuit is completed, and arranged to travel over a circuit breaker and closer, formed of insulated conductors, that connect each with a separate cup or cups of the battery, whereby any desired number of cups may be brought into connection, has heretofore been employed, and I therefore lay no claim to such invention, my invention being confined to the construction and arrangement of parts pointed out in the claim.

Having thus described my invention, I claim as new, and desire to secure by Letters Patent—

In a circular switch for galvanic batteries, the combination, with the circular series, of insulated plates E, annular insulated plate G, plug H, switch-arm I, and wires D C M L, substantially as shown and described.

HENRY LOWE.

Witnesses:
JAMES T. GRAHAM,
C. SEDGWICK.